United States Patent
Arsenault et al.

(10) Patent No.: US 10,158,684 B2
(45) Date of Patent: Dec. 18, 2018

(54) CHALLENGE-RESPONSE PROXIMITY VERIFICATION OF USER DEVICES BASED ON TOKEN-TO-SYMBOL MAPPING DEFINITIONS

(71) Applicant: Cisco Technology, Inc., San Jose, CA (US)

(72) Inventors: John Arsenault, Carver, MN (US); Michael A. Ramalho, Lakewood Ranch, FL (US); Mihailo Zilovic, Lawrenceville, NJ (US); Jonathan Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 15/275,844

(22) Filed: Sep. 26, 2016

(65) Prior Publication Data
US 2018/0091565 A1  Mar. 29, 2018

(51) Int. Cl.
*G06F 15/16* (2006.01)
*H04L 29/06* (2006.01)
(Continued)

(52) U.S. Cl.
CPC ............ *H04L 65/403* (2013.01); *G06F 21/30* (2013.01); *H04L 9/3271* (2013.01); *H04L 63/08* (2013.01); *H04L 67/02* (2013.01); *H04W 12/08* (2013.01); *G06F 2221/2103* (2013.01); *H04L 63/10* (2013.01); *H04L 67/104* (2013.01); *H04W 88/02* (2013.01); *H04W 88/08* (2013.01)

(58) Field of Classification Search
None
See application file for complete search history.

(56) References Cited

U.S. PATENT DOCUMENTS 7,145,898 B1 * 12/2006 Elliott .................... H04L 12/66
370/352
2006/0053276 A1  3/2006 Lortz et al.
(Continued)

OTHER PUBLICATIONS

International Search Report and Written Opinion in corresponding International Application No. PCT/US2017/044299, dated Oct. 6, 2017, 10 pages.

*Primary Examiner* — Phyllis A Book
(74) *Attorney, Agent, or Firm* — Edell, Shapiro, & Finnan, LLC

(57) ABSTRACT

An access server communicates with a video conference device and a user device. The access server and the user device may access known mappings, including a default mapping. Each mapping is configured to map between tokens and symbols according to a distinct mapping relationship between the multi-bit tokens and the symbols. The access server instructs the video conference device to map an initial token to an initial symbol based on the default mapping and to transmit the initial symbol. The access server receives from the user device the initial token and a challenge mapping selected by the user device. The access server determines a challenge token that the challenge mapping maps to a challenge symbol, and instructs the video conference device to transmit the challenge symbol. The access server grants the user device access to an information carrying channel only if the challenge token is received from the user device.

24 Claims, 10 Drawing Sheets

(51) Int. Cl.
*H04L 29/08* (2006.01)
*H04W 12/08* (2009.01)
*G06F 21/30* (2013.01)
*H04L 9/32* (2006.01)
*H04W 88/02* (2009.01)
*H04W 88/08* (2009.01)

(56) References Cited

U.S. PATENT DOCUMENTS

| | | | |
|---|---|---|---|
| 2007/0005795 A1* | 1/2007 | Gonzalez | G06F 17/30017 709/232 |
| 2007/0053513 A1* | 3/2007 | Hoffberg | G06K 9/00369 380/201 |
| 2009/0154707 A1 | 6/2009 | Lee et al. | |
| 2010/0118989 A1 | 5/2010 | Sayana et al. | |
| 2011/0179182 A1 | 7/2011 | Vadla Ravnäs | |
| 2012/0041881 A1* | 2/2012 | Basu | G06Q 20/02 705/67 |
| 2012/0291108 A1* | 11/2012 | Talamo | H04L 9/3273 726/6 |
| 2015/0139343 A1 | 5/2015 | Chen et al. | |
| 2015/0189006 A1 | 7/2015 | Smus et al. | |
| 2015/0327001 A1 | 11/2015 | Kirshenberg et al. | |
| 2016/0012823 A1 | 1/2016 | Roos | |

\* cited by examiner

CHALLENGE-RESPONSE PROXIMITY VERIFICATION OF USER DEVICES BASED ON TOKEN-TO-SYMBOL MAPPING DEFINITIONS

TECHNICAL FIELD

The present disclosure relates to challenge-response proximity-based verification of user devices with respect to a video conference device.

BACKGROUND

Users of a collaborative work space may use various techniques such as "hot desking" to move between different work spaces/desks at different times. When the users engage in personal audio/visual communication in the collaborative work space, preferably, unique communication information of the users, e.g., their phone numbers and email addresses, follow the users to whichever work spaces the users occupy. That way, when the users make calls, their unique caller identifiers (IDs) will be displayed at the called devices, and the users may receive calls made to their phone numbers regardless of which shared spaces the users currently occupy. Existing options for the shared work space model include: installing a "softphone" application on a user device, such as a laptop; using a personal mobile phone; and using an "extension mobility" application. All of these options present challenges and limitations.

Some work spaces include dedicated communication devices, such as videoconference devices and voice-over-Internet Protocol (VoIP) phones, through which users/user devices may participate in audio/visual calls. "Pairing" is a technique used to identify user devices that are in physical proximity to the dedicated communication devices to help prepare for and setup such calls. Conventional pairing techniques often lack sufficient device authentication to avoid spoofing.

DESCRIPTION OF EXAMPLE EMBODIMENTS

Overview

An access server is configured to communicate over a network with a video conference device and a user device. The access server and the user device have access to known mappings, including a default mapping. Each mapping is configured to map between multi-bit tokens and symbols according to a distinct mapping relationship between the multi-bit tokens and the symbols for the given mapping. The access server instructs the video conference device to map an initial token to an initial symbol based on the default mapping and to transmit the initial symbol. The access server receives from the user device the initial token and an indication of a challenge mapping selected from the mappings by the user device. In response to receiving the initial token (from the user device), the access server determines among the tokens a challenge token that the challenge mapping maps to a challenge symbol, and instructs the video conference device to transmit the challenge symbol. The access server waits to receive the challenge token from the user device, and, if the challenge token is received from the user device, grants the user device access to an information carrying channel between the video conference device and the user device

Example Embodiments

Figure 1:
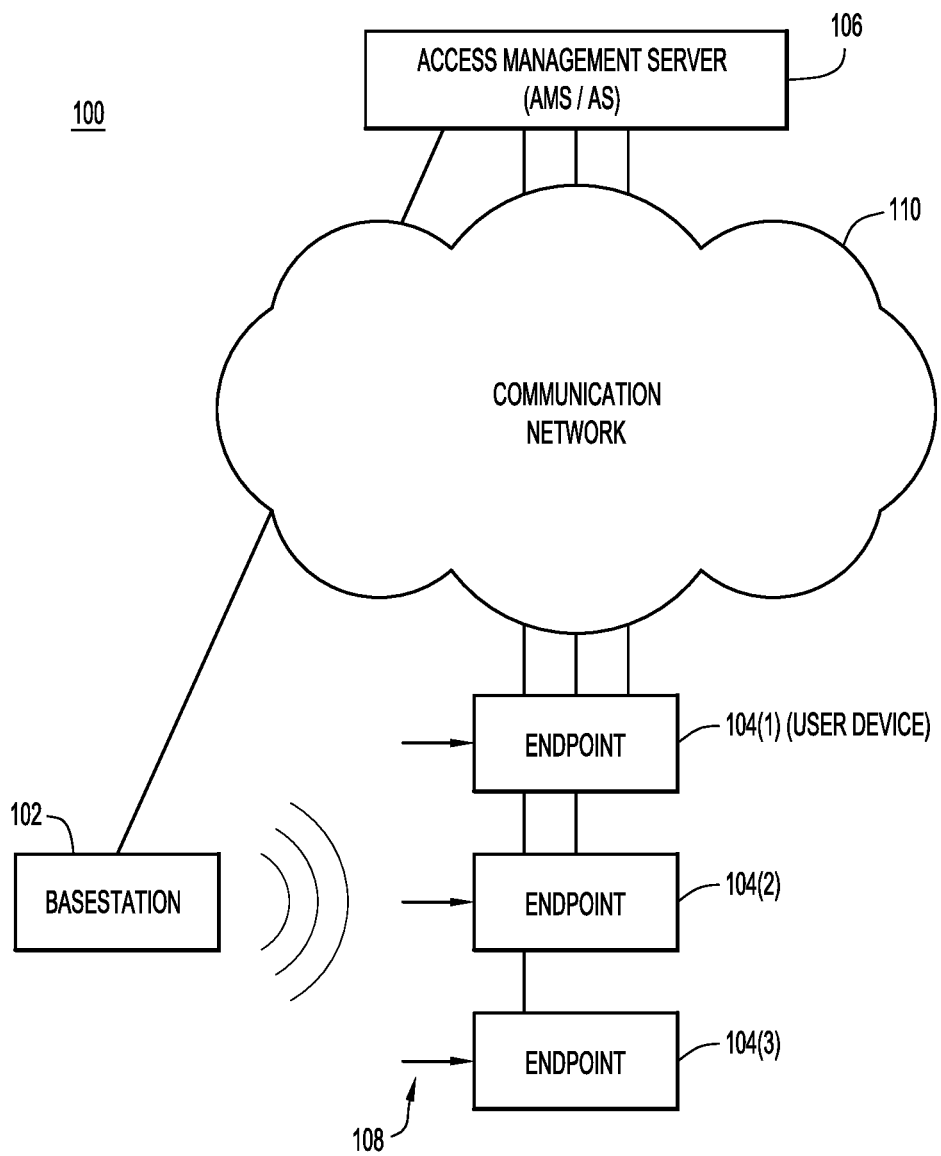
FIG. 1 is an illustration of a communication environment in which embodiments directed to challenge-response proximity verification using token-to-symbol mapping definitions may be implemented, according to an example embodiment.

With reference to FIG. 1, there is an illustration of a communication environment 100 in which embodiments directed to proximity verification may be implemented. Communication environment 100 includes: a portable audio/visual communication base station (BS) 102 equipped for audio/visual communication, such as a video conference device, a voice over Internet Protocol (VOIP) phone, or the like, and configured to establish audio/visual communication sessions with other base stations (not shown in FIG. 1); user/endpoint devices 104(1)-104(3) (collectively/individually referred to as "endpoints 104"/"endpoint 104(*i*)" or "user devices 104"/"user device 104(*i*)"), each configured to communicate with the base station when in range of the base station over one or more acoustic channels 108, each of the endpoints operated by a respective user (not shown in FIG. 1) associated with the endpoint; and an access management server (AMS) 106 (referred to more simply as an "access server" (AS) 106) that communicates with the base station and each of the endpoints over a communication network 110 connected with the base station, the endpoints, and the AS. Communication network 110 may include one or more of a wired or wireless local area network (LAN) and wired or wireless wide area network (WAN), including the Internet. Network 110 may support a variety of protocols, including, without limitations, the Internet Protocol (IP), the Session Initiation Protocol (SIP), the Hypertext Transfer Protocol (HTTP), and the Real-time Transport Protocol (RTP), and so on. Base station 102 and endpoints 104 may be deployed in a shared work space having many base stations deployed across many rooms in a building or across many buildings in a campus or other administrative domain such as an enterprise (not shown in FIG. 1). In the shared work space, base station 102 and all of endpoints 104 may occupy the same room or, alternatively, different rooms. Moreover, endpoints 104 may move between the rooms over time.

Base station 102 and endpoints 104 are each configured to transmit and receive acoustic signals, thus an endpoint in range of the base station may communicate with the base station over one or more of acoustic channels 108 established between the base station and the endpoint. Base station 102 and endpoints 104 may use any known or hereafter developed technique for channelizing audio to create the acoustic channels, such as: Time Division Multiplexing (TDM), in which different time slots are assigned to different channels; Frequency Division Multiplexing (FDM), in which different carrier frequencies or different frequency bands are assigned to different acoustic channels; Code Division Multiplexing, in (CDM), in which different spreading codes, e.g., spread spectrum codes, are assigned to different channels.

Base station 102 and a given endpoint 104(i) are considered to be in range of each other if an acoustic signal transmitted by one of the devices may be received, detected, and processed by the other device, e.g., when the two devices occupy the same room. Those of endpoints 104 in range of base station 102 may establish and engage in audio/visual conference sessions over network 110 via the base station. Once a conference session is established, the participating endpoints in range of base station 102 exchange information/content with the base station over one or more acoustic channels, and in turn the base station exchanges the information/content with network 110. Given the dynamic nature of the shared work space in which endpoints 104 may move between rooms as their associated users enter and exit the rooms, it is helpful to know, with a high level of certainty, which of endpoints 104 are in range of, e.g., in the same room as, base station 102 at any given time and thus eligible to participate in conference sessions via that base station.

According to embodiments presented herein, access management server 106 interacts with base station 102 and endpoints 104 to detect those of the endpoints that are in range of the base station 102 at any given time, and then authenticate each detected endpoint based on a challenge-response communication protocol and a predetermined set of token-to-symbol mapping definitions accessible to the access management server, the endpoints, and the base station, as will be described in detail below. Once a given endpoint has been authenticated, various operations may be performed with respect to that endpoint. For example, user profile information (e.g., a user phone number and an email address) stored in a centralized user profile database may be downloaded from the database to base station 102 for subsequent use with respect to the authenticated endpoint, such as for receiving and making phone calls via the base station. Also, each authenticated endpoint may be assigned, and granted access to, a secure acoustic channel between the given endpoint and the base station and over which the endpoint may exchange information/content during a conference session.

The above-described detecting and authenticating together represent challenge-response "pairing" of base station 102 with those endpoints 104 that are in range of the base station. Such pairing is also referred to herein as "challenge-response proximity verification" (or simply "proximity verification") of the endpoints because the pairing verifies the authenticity of those endpoints that are in range (i.e., proximate) the base station. Thus, the proximity verification of endpoints described herein is a form of authentication of the endpoints. After proximity verification/authentication, the base station and each verified (in-range and authenticated) endpoint are referred to as "paired devices."

Figure 2:
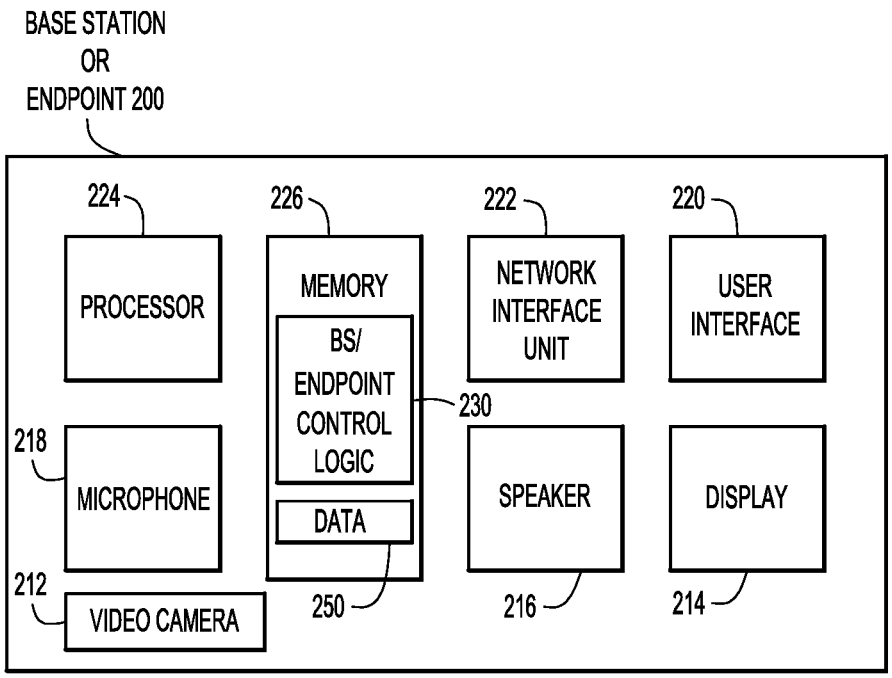
FIG. 2 a simplified block diagram of a communication device representative of a base station and endpoint devices (e.g., user devices) in the communication environment, according to an example embodiment.

With reference to FIG. 2, a simplified block diagram of an example device 200 representative of base station 102 and each of endpoints 104/user devices 104 is shown. Endpoints 104 may include, but are not limited to, laptop and tablet computers, a smartphone, and the like. Device 200 may include a video camera 212, a display 214, a loudspeaker 216 to transmit audio/acoustic signals, a microphone 218 to detect audio/acoustic signals, a user interface 220 to receive input from a user, a network interface unit (NIU) 222 that enables the device to communicate over wired connections or wirelessly with a network, a processor 224, and a memory 226 to store software instructions and data all connected to each other directly or indirectly. User interface 220 may be in the form of a keyboard, mouse and/or a touchscreen user interface to allow for a user of device 200 to interface with and operate the device. NIU 222 may include, for example, an Ethernet card or other interface device having a connection port and that enables device 200 to communicate over a communication network via the connection port. In a wireless embodiment, NIU 222 includes a wireless transceiver and an antenna to transmit and receive wireless communication signals to and from the network.

Processor 224 may include one or more microcontrollers and/or microprocessors, for example, configured to execute software instructions of BS/Endpoint control logic 230 stored in memory 220 for implementing the processes described herein. The collection of microcontrollers may include, for example: a video controller to receive, send, and process video signals related to display 214 and video camera 212; an audio controller to receive, send, and process audio signals related to loudspeaker 216 and microphone 218; and a high-level controller to provide overall control. Portions of memory 226 (and the instructions therein) may be integrated with processor 224 and the aforementioned video and audio controllers. Processor 224 prepares audio/video captured by microphone 218/video camera 212 for transmit, and causes the prepared data packets to be transmitted to the network. Processor 224 processes audio/video from data packets received from the network and causes the processed audio/video to be presented to a user via loudspeaker 216/display 214. Also, processor 224 may map tokens to audio/acoustic symbols to be transmitted from loudspeaker 216 over an audio channel, and may receive and then decode signals/symbols detected by microphone 218 from the audio channel, to produce tokens, as will be described below. The terms "audio" and "acoustic" used herein are synonymous and interchangeable.

Memory 226 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 226 may comprise one or more tangible (non-transitory) computer readable storage media (e.g., a memory device) encoded with software (e.g., control logic/software 230) comprising computer executable instructions and when the software is executed (by processor 224) it is operable to perform the operations described herein. Control logic 230 includes instructions to perform proximity verification. In base station 102, logic 230 performs operations related to the base station described below. In endpoint 104, logic 230 performs operations related to an endpoint described below.

Memory 226 also stores data 250 generated and used by logic 230. Non-limiting examples of data 250 include a predetermined set of mappings, including a default mapping, used for proximity verification, various identifiers of base station 102 or endpoints 104, and so on.

Figure 3:
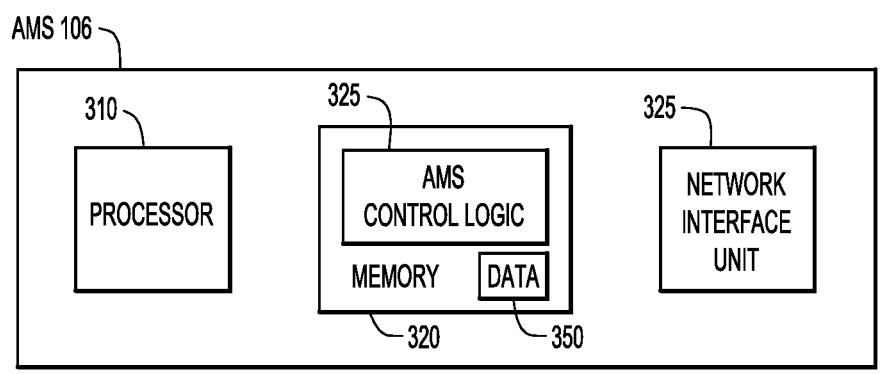
FIG. 3 is a simplified block diagram of an access management server in the communication environment, according to an embodiment.

With reference to FIG. 3, a simplified block diagram of access management server 106 is shown, according to an embodiment. Server 106 includes a processor 310 to process instructions relevant to proximity verification in environment 100, memory 320 to store a variety of data and software instructions, including access management server control logic/software 325. Server 106 also includes a network interface unit 325 similar to network interface unit 222 described above that enables network communications so that the server can communicate with other devices, e.g., base station 102 and endpoints 104, as explained in further detail hereinafter. Memory 320 may comprise read only memory (ROM), random access memory (RAM), magnetic disk storage media devices, optical storage media devices, flash memory devices, electrical, optical, or other physical/tangible (e.g., non-transitory) memory storage devices. Processor 310 is, for example, a microprocessor or microcontroller that executes instructions for implementing the processes described herein. Thus, in general, memory 320 may comprise one or more tangible (non-transitory) computer readable storage media (e.g., a memory device) encoded with software (e.g., the meeting server control logic/software 325) comprising computer executable instructions and when the software is executed (by the processor 310) it is operable to perform the operations described herein.

Memory 320 also stores data 350 generated and used by logic 325. Non-limiting examples of data 350 include a predetermined set of mappings, including a default mapping, used for proximity verification, various identifiers of base station 102 or endpoints 104, and so on.

As briefly described above, challenge-response proximity verification uses a predetermined set of mapping definitions (also referred to more simply as "mappings"). The mappings are now described in brief, and then the challenge-response proximity verification process will be described in detail. Each mapping in the predetermine set of mappings is configured to map, bi-directionally, multi-bit tokens (i.e., words) to corresponding symbols (i.e., communication symbols, such as acoustic symbols) according to a distinct mapping relationship, or mapping order, between the tokens and symbols that is unique to the given mapping. The predetermined set of mappings includes a default mapping that is known to all endpoints 104 and AS 106. The mappings are each configured to map each token to only one corresponding symbol. In an embodiment, each mapping is one-to-one and onto with respect to the way in which the mapping maps between the tokens and the symbols. The mappings are also configured with respect to each other such that a given token maps to different symbols across the mappings due to the distinct mapping relationships of the different mappings. In examples described below, each of the symbols of a given mapping may be transmitted as an acoustic symbol over an acoustic channel, e.g., over one of acoustic channels 108.

Figure 4:
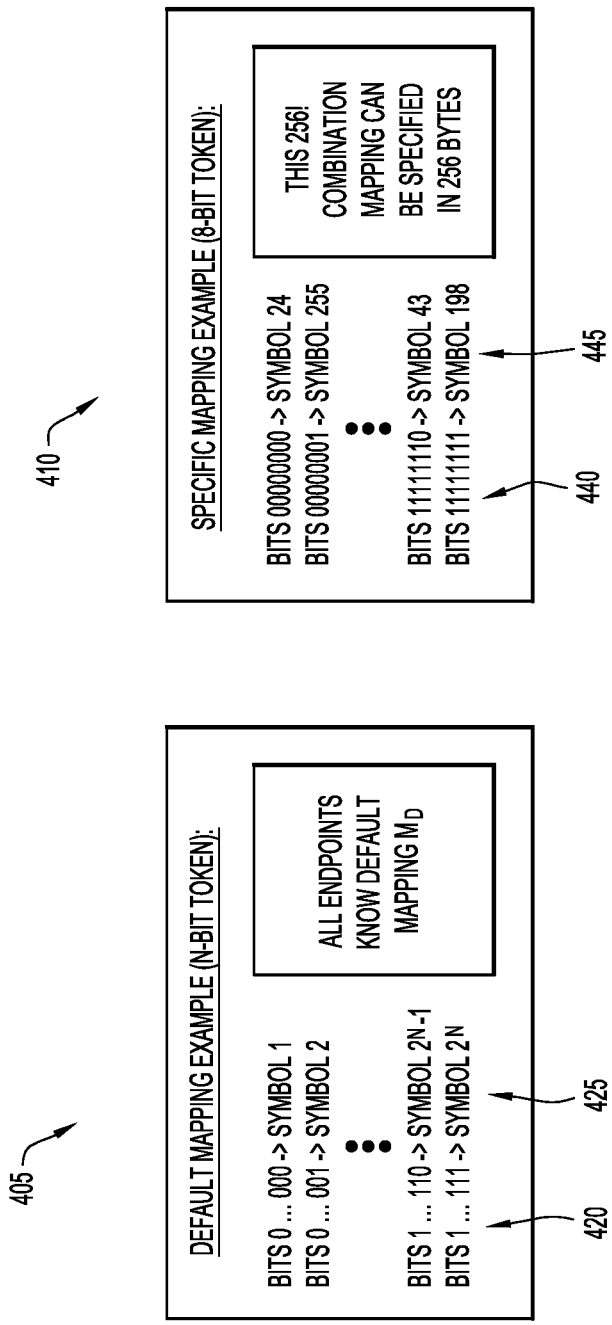
FIG. 4 shows illustrations of mapping definitions that may be used for proximity verification of the endpoint devices, according to an example embodiment.

With reference to FIG. 4, there are illustrations of example mappings 405 and 410 that may be used for proximity verification of endpoints. Mapping 405 is a generic default mapping (also referred to as default mapping $M_D$) that would be known to all endpoints 104 as a "starting point" mapping. Mapping 405 maps a set of N-bit tokens 420 (i.e., a token space) to a set of symbols 425 (i.e., a symbol space), and vice versa. In mapping 405, the distinct mapping relationship, or mapping order, maps ordered, incrementally increasing, binary token values 0 . . . 000, 0 . . . 001, 0 . . . 010, etc., to respective ordered, incrementally increasing, symbols Symbol 1, Symbol 2, Symbol 3, etc. Many other mappings may be created from mapping 405 by changing the mapping relationship of mapping 405. In one example, the order of symbols 425 may be reversed with respect to the order of tokens 420, which represents an inverse mapping relationship with respect to that of default mapping 405. In another example, the order of symbols 425 may be permuted, e.g., scrambled or shuffled, with respect to the order of tokens 405, which represents a permuted mapping relationship/order with respect to that of default mapping 405. Each distinct mapping relationship correspondingly results in a distinct mapping such that each mapping maps the same set of tokens to the same set of symbols, but in a different way from the other mappings.

Mapping 410 is an example of a specific mapping among many possible mappings that maps a set of 8-bit tokens 440 to a set of symbols 445. The distinct mapping relationship of mapping 410 is different from, and appears random with respect to, the distinct mapping relationship of other mappings that are possible using the 8-bit tokens. The use of 8-bit tokens yields 256! distinct mapping relationships (and thus different mappings), where each distinct mapping relationship may be a permutation of a known default mapping relationship. In an embodiment, each distinct mapping relationship may have a known relationship to each other distinct mapping relationship (e.g., symbol order reversal, and so on), such that each mapping may be derived from each other mapping based on the known relationship. An example of this is discussed below in connection with FIG. 6. Also, use of mappings in challenge-response proximity verification will be described more fully below in connection with FIGS. 5 and 7.

We also note that if a token larger than N bits is desired, such a token can be created as a concatenation of N-bit tokens; for example a 32-bit token can be formed as a concatenation of four 8-bit tokens. Since there are 256! (factorial, thus, a very large number) mappings possible with an 8-bit token mapping, concatenation may be used to create tokens greater than 8 bits in length. This particular 8-bit token convention conveniently allows for tokens of a length that is an integer multiple of 8. When N-bit tokens are created in this manner, the output symbols are likewise concatenated. Hereafter, whenever an X-bit token is referenced below, it is understood that such a token may have been created from a single mapping of X bits (e.g., 405) or by an appropriate concatenation of smaller than X-bit tokens (e.g., multiple concatenations of 410).

Figure 5:
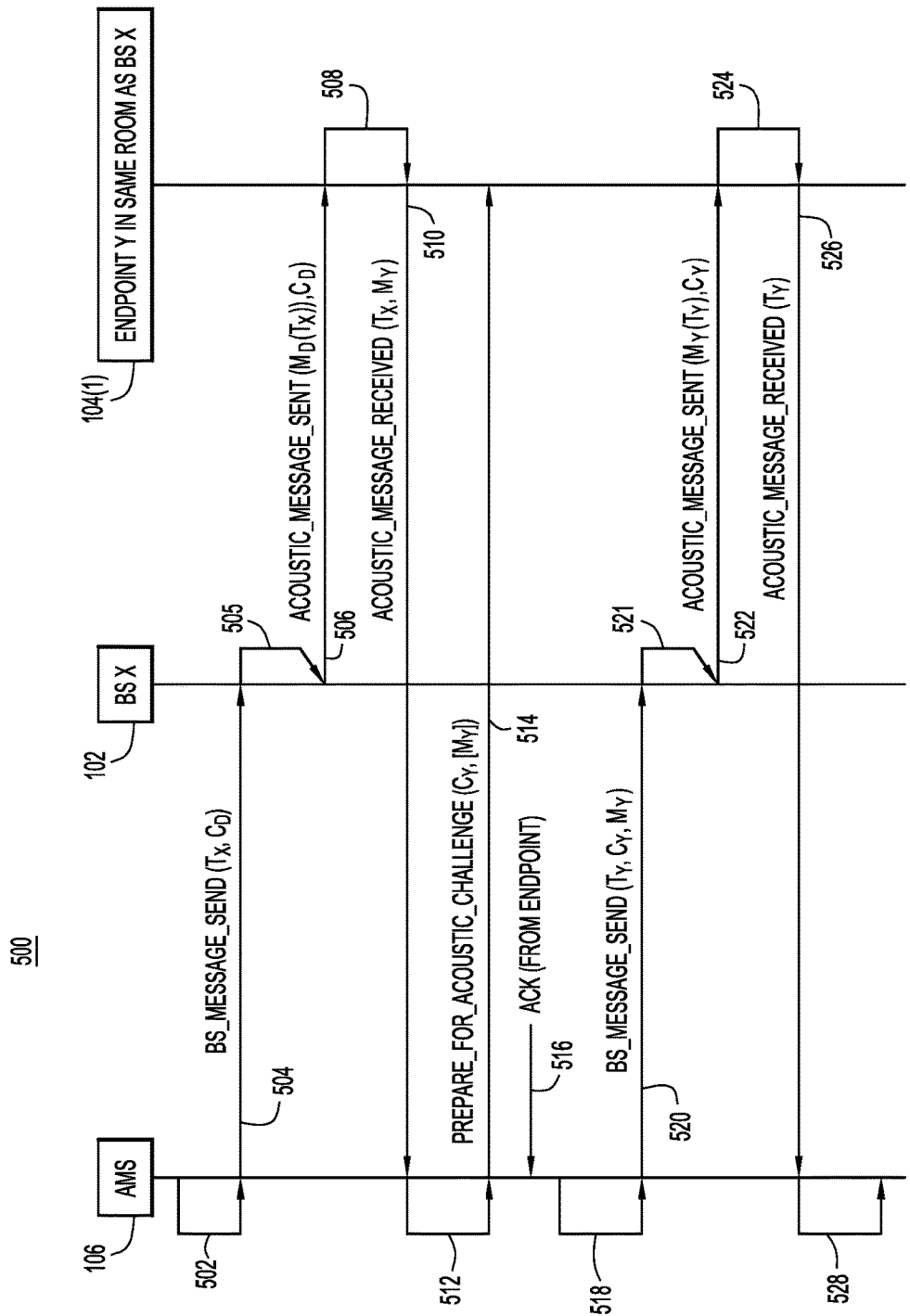
FIG. 5 is a transaction diagram by which challenge-response proximity verification using token-symbol mapping definitions may be achieved in the communication environment, according to an embodiment.

With reference to FIG. 5, there is an example transaction diagram 500 by which challenge-response proximity verification/authentication using a set of predetermined mappings is achieved in environment 100, according to a first embodiment. Transaction diagram 500 shows messages exchanged between AS 106, base station 102 (shown as "BS X" in FIG. 5), and endpoint 104(1)/user device 104(1) (shown as "Endpoint Y" in FIG. 5). AS 106 communicates with base station 102 and endpoint 104(1) over network 110, while base station 102 and endpoint 104(1) communicate with each other over one or more acoustic channels. Diagram 500 references endpoint 104(1) by way of example, only, and any of the other endpoints may be used in the challenge-response proximity verification process.

It is assumed that (i) endpoint 104(1) and base station 102 are in range of each other, e.g., in the same room, and (ii) AS 106 and all of endpoints 104 have access to a predetermined set of mappings, including a predetermined default mapping $M_D$. Base station 102 may also have access to the mappings. Such access may be represented in different forms. In one example, a database of the mappings may be stored in device memory. The database stores each mapping with an associated unique index that identifies the mapping, such that a given mapping may be retrieved based on its index. In other words, the index represents an indication of the mapping. In another example, each mapping may be derived from the default mapping based on a known distinct relationship between each mapping and the default mapping, such that a given known distinct relationship and the default mapping collectively represent an indication of a given mapping (from which the given mapping may be derived).

At 502, AS 106 selects an initial token $T_X$ (also referred to as a "room token $T_X$"). Room token $T_X$ will be used to solicit initial responses from endpoints in range of base station 102. The initial token is referred to as a room token because it is broadcast as a probe to solicit responses from endpoints in the vicinity of, e.g., the same room as, base station 102, as described below.

At 504, AS 106 sends to base station 102 a request/instruction to broadcast room token $T_X$ over a default channel $C_D$ (e.g., an acoustic channel) using/based on default mapping $M_D$. The descriptor "BS_Message_Send ($T_X$, $C_D$)" denotes the request message sent at 504.

At 505, base station 102 receives the request/instruction sent at 504 and responsive thereto, maps initial/room token $T_X$ to a corresponding initial/room symbol based on default mapping $M_D$.

At 506, base station 102 transmits the room symbol as an acoustic symbol over default channel $C_D$. The descriptor "Acoustic_Message_Sent ($M_D(T_X)$), $C_D$)" represents the room symbol transmitted over default channel $C_D$, where "$M_D(T_X)$" represents the mapping operation of room token $T_X$ to the corresponding room symbol based on default mapping $M_D$. In other words, "$M_D(T_X)$" represents the room symbol. Accordingly, the request sent by AS 106 at 502 causes base station 102 to perform operations 505 and 506.

Any endpoint in range of base station 102 and listening to default channel $C_D$ may receive, detect, and decode (i.e., map) the room symbol transmitted at 506 using default mapping $M_D$ to recover token $T_X$. This includes endpoint 104(1) in the same room as base station 102.

At 508, endpoint 104(1) receives the room symbol and decodes the room symbol based on default mapping $M_D$ to recover corresponding room token $T_X$. Responsive thereto, to prepare for a proximity verification challenge, endpoint 104(1) selects/chooses an arbitrary mapping $M_Y$ among the predetermined set of mappings, other than default mapping $M_D$. Mapping $M_Y$ represents an endpoint nonce and is referred to as a challenge mapping $M_Y$. Endpoint 104(1) selects challenge mapping $M_Y$ in isolation of other endpoints so that no other endpoints are aware that challenge mapping $M_Y$ was selected.

At 510, responsive to selecting challenge mapping $M_Y$ and decoding room token $T_X$, endpoint 104(1) sends to AS 106 a response message "Acoustic_Message_Received ($T_X$, $M_Y$)" including room token $T_X$, an indication of the challenge mapping $M_Y$, and an identifier and/or network address (e.g., an IP address) of endpoint 104(1). The response message notifies AS 106 that endpoint 104(1) decoded room token $T_X$ and thus is an assertion that it is in range of base station 102. The indication of challenge mapping $M_Y$ is configured/sufficient to enable AS 106 to access/derive challenge mapping $M_Y$ based on that indication. For example, the indication may be the actual challenge mapping $M_Y$, an index identifying the mapping in a mapping database, or other mapping-related information that enables AS 106 to derive challenge mapping $M_Y$ from the information. Just after operation 510, only endpoint 104(1) and AS 106 know challenge mapping $M_Y$.

The selecting and sending of challenge mapping $M_Y$ by endpoint 104(1) at 508 and 510 initiates a challenge-response sequence, including next operations 512-528, to further authenticate endpoint 104(1) (i.e., to definitively prove the assertion of 510 that endpoint 104(1) is in range of base station 102).

At 512, AS 106 receives the response message transmitted at 510. In response to receipt of the response message, AS 106 optionally selects a non-default channel $C_Y$ to be used for an acoustic challenge to endpoint 104(1). In another example, default channel $C_D$ may be used for the acoustic challenge, in which the selection of channel $C_Y$ is omitted and transactions 514 and 516 described below may not be employed.

At 514, also in responsive to receipt of the response message, AS 106 sends to endpoint 104(1) a Prepare_For_Acoustic_Challenge ($C_Y$, $M_Y$) message to inform the endpoint that an acoustic challenge will ensue on acoustic channel $C_Y$ and that the acoustic challenge will be based on challenge mapping $M_Y$. As noted above, if the default channel $C_D$ is used for the acoustic challenge (i.e., $C_Y=C_D$), this transaction may not be required.

At 516, endpoint 104(1) receives the message sent by base station 102 at 514 and responsive thereto sends to the base station an acknowledgement "ACK" of the message. As noted above, if the default channel $C_D$ is used for the acoustic challenge (i.e., $C_Y=C_D$), this transaction may not be required.

At 518, AS 106 selects a new token $T_Y$ with which to challenge endpoint 104(1). New token $T_Y$ is an AS nonce referred to as a challenge token $T_Y$.

At 520, AS 106 sends to base station 102 a request/instruction "BS_Message_Send ($T_Y$, $C_Y$, $M_Y$)" to transmit an acoustic challenge to endpoint 104(1) using challenge token $T_Y$ and challenge mapping $M_Y$, and to transmit the acoustic challenge over non-default channel $C_Y$. In an embodiment, the request/instruction includes an indication of challenge mapping $M_Y$ sufficient to enable base station 102 to access/derive the challenge mapping. After sending the request at 520, AS 106 waits to receive a response message from endpoint 104(1) that the endpoint generated and sent in response to the acoustic challenge (see operations 526 and 528 below).

At 521, base station 102 receives the request/instructions sent at 520 and, responsive thereto, maps challenge token $T_Y$ to a corresponding challenge symbol based on challenge mapping $M_Y$.

At 522, base station 102 transmits the challenge symbol as an acoustic symbol over non-default channel $C_Y$. The descriptor "Acoustic_Message_Sent ($M_Y(T_Y)$), $C_Y$)" represents the challenge symbol transmitted over non-default channel $C_Y$, where "$M_Y(T_Y)$" represents the mapping operation of challenge token $T_Y$ to the corresponding challenge symbol based on non-default mapping $M_Y$. In other words, "$M_Y(T_Y)$" represents the challenge symbol.

At 524, endpoint 104(1) receives the challenge symbol and decodes it based on challenge mapping $M_Y$ to recover corresponding challenge token $T_Y$. Practically speaking, only endpoint 104(1) will recover challenge token $T_Y$ from the challenge symbol because (i) endpoint 104(1) is the only endpoint that knows that challenge mapping $M_Y$ was selected, and (ii) there is a large number of possible mappings other than challenge mapping $M_Y$. Given these two conditions, it is highly unlikely that any other endpoint that also receives the challenge symbol will guess the challenge mapping correctly to recover the challenge symbol.

At 526, responsive to decoding challenge token $T_Y$, endpoint 104(1) sends to AS 106 a response message "Acoustic_Message_Received ($T_Y$)" including challenge token $T_Y$, and the identifier of endpoint 104(1). The response message notifies AS 106 that endpoint 104(1) decoded room token $T_Y$.

At 528, AS 106 receives the response message sent at 526 and, based on the response message, verifies the assertion of 510 that endpoint 104(1) is in range of the base station, and declares the endpoint authenticated. In an embodiment, base station 102 more specifically verifies that endpoint 104(1) occupies the same room as the base station based on the response message.

Once AS 106 has verified endpoint 104(1) as described above, the AS may instruct base station 102 to grant the endpoint access to a secure acoustic channel between the base station and the endpoint and over which the two devices may exchange information/content in a conference session, for example. To grant endpoint 104(1) access to a secure channel, AS 106 may send an identifier of the secure channel to endpoint 104(1) directly (over network 110) or via base station 102. Also, AS 106 may download to base station 102 user profile information for the user associated with endpoint 104(1), such as a user phone number, an email address, and so on.

Figure 6:
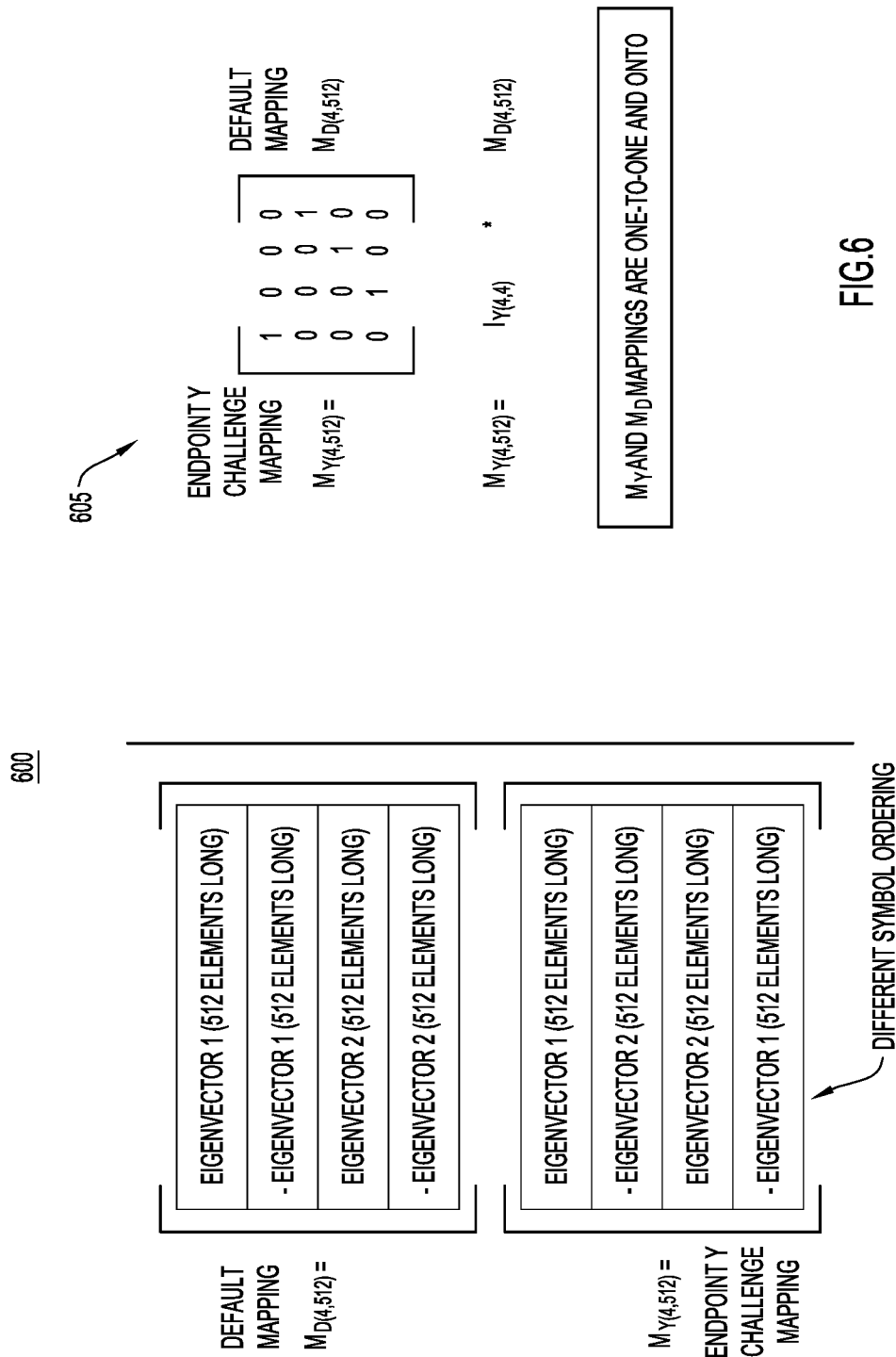
FIG. 6 is an illustration of a method creating/deriving a challenge mapping from a default mapping, according to an embodiment.

With reference to FIG. 6, there is shown an illustration of an example method 600 of creating/deriving a challenge mapping from a default mapping in a CDM spread spectrum system. Specifically, with reference to the left-hand side of FIG. 6, method 600 transforms a default mapping $M_{D(4,512)}$ (formatted as a matrix column) to a challenge mapping $M_{Y(4,512)}$ (also formatted as a matrix column). Default mapping $M_{D(4,512)}$ and challenge mapping $M_{Y(4,512)}$ are each one-to-one and Onto. Default mapping $M_{D(4,512)}$ maps ordered 2-bit tokens, e.g., 00, 01, 10, 11, (not shown in FIG. 6) to corresponding ordered symbols. By means of this example, the symbols are shown to be Eigenvector 1, –Eigenvector 1, Eigenvector 2, and –Eigenvector 2 of a CDM spread spectrum system (where each eigenvector consists of 512 elements). Other acoustic communications systems will have symbol representations appropriate for the orthogonalization process their systems employ. On the other hand, challenge mapping $M_{Y(4,512)}$ maps the ordered tokens, e.g., 00, 01, 10, 11, to re-ordered symbols Eigenvector 1, –Eigenvector 2, Eigenvector 2, –Eigenvector 1. Thus, the order of the symbols in challenge mapping $M_{Y(4,512)}$ is permuted with respect to the order of the symbols in default mapping $M_{D(4,512)}$, assuming the corresponding token order remains the same for each mapping.

With reference to the right-hand side of FIG. 6, at 605, a matrix transformation transforms default mapping $M_{D(4,512)}$ to challenge mapping $M_{Y(4,512)}$. That is, a permutation matrix $I_{Y(4,4)}$ operates on default mapping $M_{D(4,512)}$ to produce challenge mapping $M_{Y(4,512)}$ based on the equation $M_{Y(4,512)} = I_{Y(4,4)} * M_{D(4,512)}$, where $I_Y$ is formed from an Identity matrix (I), but with columns/rows permutated to reflect a desired difference in mapping from the default mapping, and "*" is a matrix operator. Permutation matrix $I_{Y(4,4)}$ permutes the order, or re-orders, the default mapping symbols to produce the challenge mapping. Other permutation matrices may be used to generate other challenge mappings. In summary, the tuple $[M_{D(4,512)}, I_{Y(4,4)}]$ represents any number of possible challenge mappings, where the challenge mappings may be derived based on the tuple according to the transformation: $M_{Y(4,512)} = I_{Y(4,4)} * M_{D(4,512)}$. Thus, any device with access to default mapping $M_D$ may derive challenge mapping $M_Y$ given the appropriate permutation matrix $I_Y$. For example, the permutation matrix $I_Y$ may serve as an indication of challenge mapping $M_Y$, if knowledge of default mapping $M_D$ is assumed.

Several observations may be made from method 600. First, for any token T challenge mapping $M_Y$ maps token $T_?$ to a challenge symbol $M_Y(T_?)$, while default mapping $M_D$ maps token $T_?$ to a default symbol $M_D(T_?)$ that is different from the challenge symbol. Second, any challenge mapping $M_Y$ can be expressed as $M_Y = I_Y M_D$. Third, when a challenge symbol $M_Y(T_Y)$ is sent by base station 102 to an endpoint that is in the process of being challenged over a given channel (i.e., during proximity verification), an unchallenged endpoint listening to that channel, but that did not select (and is thus unaware of) challenge mapping $M_Y$, is able to decode/map the challenge symbol $M_Y(T_Y)$ using default mapping $M_D$ to recover a different token, i.e., token $T_?$. In other words, from the perspective of the unchallenged endpoint, at the symbol level, the decode operation appears as $M_Y(T_Y) = M_D(T_?)$. Because there is a one-to-one and onto relationship between $M_Y$ and $M_D$, the challenge token $T_Y$ simply appears as a new room token $T_?$ to the unchallenged endpoint. Thus, if a previously authenticated endpoint reports this apparently new room token $T_?$ to AS 106 (e.g., via a 510 transaction from this endpoint), the AS could optionally use this knowledge to know that this previously authenticated endpoint is still present in the room. Thus the challenge of a given endpoint can be used by unauthenticated endpoints as the new/initial room token (i.e., used to initiate a challenge) or by a previously authenticated/challenged endpoint to reaffirm that it is still in range of the base station. These two uses are combined and explained in connection with FIG. 7.

Figure 7:
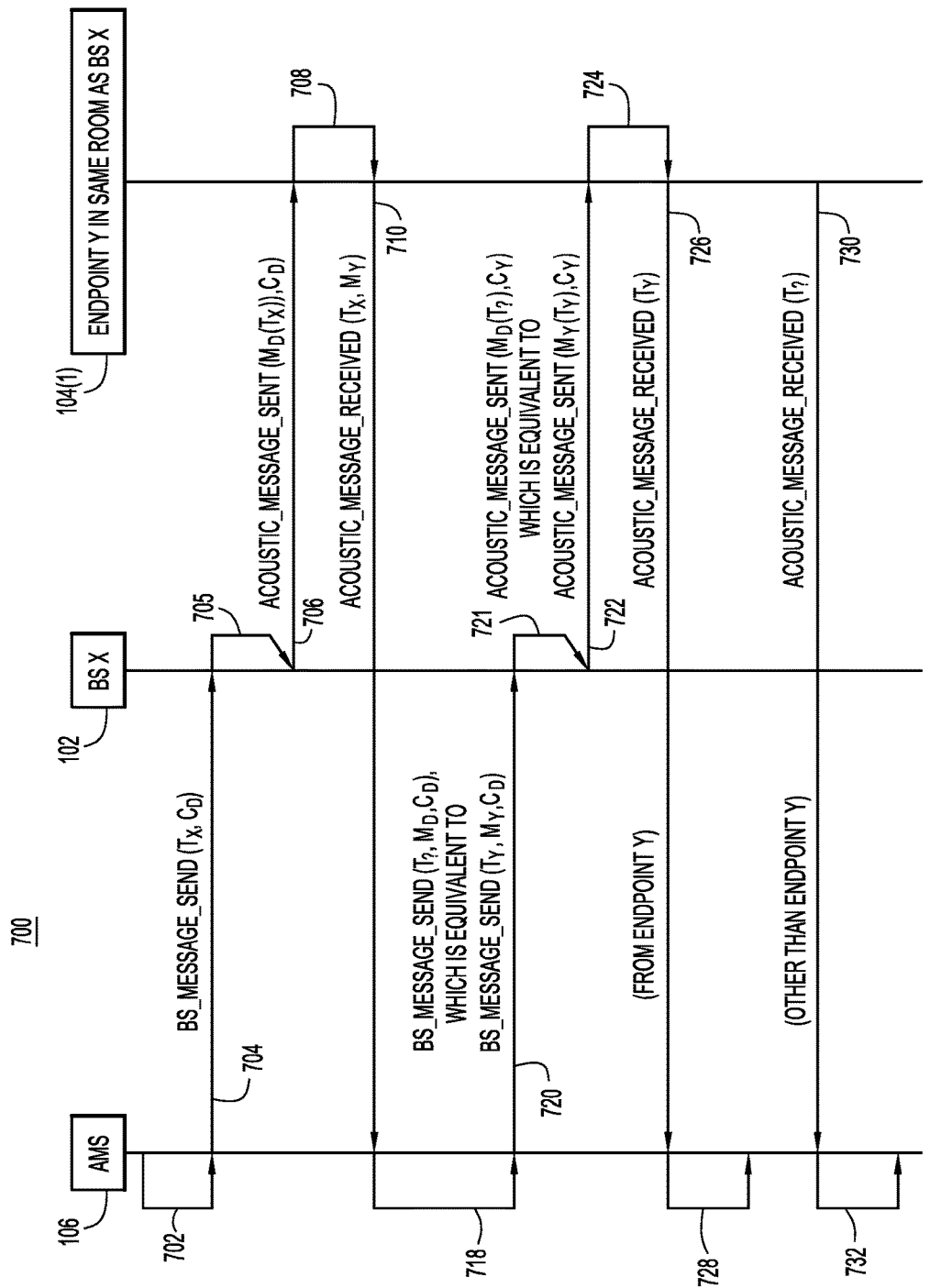
FIG. 7 is another transaction diagram by which challenge-response proximity verification is achieved in the communication environment using a new room/dummy token, according to an embodiment.

With reference to FIG. 7, there is an example transaction diagram 700 by which challenge-response proximity verification/authentication is achieved using a set of predetermined mappings and an additional new room/dummy token, according to a second embodiment.

At 702, AS 106 selects a room token $T_X$.

At 704, AS 106 sends to base station 102 a request/instruction "BS_Message_Send ($T_X$, $C_D$)" to broadcast room token $T_X$ over a default channel $C_D$ (e.g., an acoustic channel) using default mapping $M_D$.

At 705, base station 102 receives the request/instruction sent at 704 and responsive thereto, maps room token $T_X$ to a corresponding room symbol based on default mapping $M_D$.

At 706, base station 102 transmits the room symbol as an acoustic symbol over default channel $C_D$. The descriptor "Acoustic_Message_Sent ($M_D(T_X)$), $C_D$)" represents the room symbol transmitted over default channel $C_D$, where "$M_D(T_X)$" represents the mapping operation of room token $T_X$ to the corresponding room symbol based on default mapping $M_D$. In other words, "$M_D(T_X)$" represents the room symbol.

Any endpoint/user device in range of base station 102 and listening to default channel $C_D$ may receive, detect, and decode (i.e., map) the room symbol transmitted at 706 to recover token $T_X$. This includes endpoint 104(1) in the same room as base station 102.

At 708, endpoint 104(1) receives the room symbol and decodes the room symbol based on default mapping $M_D$ to recover corresponding room token $T_X$. To prepare for a challenge, endpoint 104(1) selects/chooses an arbitrary mapping $M_Y$ among the predetermined set of mappings, other than default mapping $M_D$. Mapping $M_Y$ represents an endpoint nonce and is referred to as a challenge mapping. Endpoint 104(1) selects challenge mapping $M_Y$ in isolation of other devices so that only the endpoint knows the challenge mapping at its time of selection.

At 710, responsive to decoding room token $T_X$, endpoint 104(1) sends to AS 106 a response message "Acoustic_Message_Received ($T_X$, $M_Y$)" including room token $T_X$, an indication of the challenge mapping $M_Y$ (e.g., $I_Y$, from which challenge mapping $M_Y$ may be derived using default matrix $M_D$), and an identifier and/or network address (e.g., an IP address) of endpoint 104(1). The response message notifies AS 106 that endpoint 104(1) decoded room token $T_X$. Just after operation 710, only endpoint 104(1) and AS 106 know challenge mapping $M_Y$.

At 718, responsive to return of room token $T_X$, AS 106 selects a new room token $T_?$ with which to challenge endpoint 104(1). New room token $T_?$ is also referred to as a "dummy" token $T_?$ because it represents an alternative to challenge token $T_Y$ that will also result in a mapping to the challenge symbol.

AS 106 also determines the challenge token $T_Y$ based on new room token $T_?$, default mapping $M_D$, and challenge mapping $M_Y$. In an example, because $M_Y(T_Y)$ and $M_D(T_?)$ both represent the same challenge symbol, AS 106 solves the equation $M_Y(T_Y)=M_D(T_?)$ to determine challenge token $T_Y$.

At 720, AS 106 sends to base station 102 a request/instruction "BS_Message_Send ($T_?$, $M_D$, $C_D$)" to transmit an acoustic challenge to endpoint 104(1) using new room/dummy token $T_?$ and default mapping $M_D$, and to transmit the acoustic challenge over default channel $C_D$. Because $M_Y(T_Y)=M_D(T_?)$ (i.e., $M_Y(T_Y)$ and $M_D(T_?)$ represent the same symbol), at least at the symbol level, the request/instruction "BS_Message_Send ($T_?$, $M_D$, $C_D$)" is equivalent to and has the same effect on base station 102 as a request/instruction "BS_Message_Send ($T_Y$, $M_Y$, $C_D$)." After sending the request at 720, AS 106 waits to receive a response message from endpoint 104(1) that the endpoint generated and sent in response to the acoustic challenge (see operations 726 and 728 below).

At 721, base station 102 receives the request/instructions sent at 720 and, responsive thereto, maps dummy/new room token $T_?$ to the corresponding challenge symbol based on default mapping $M_D$.

At 722, base station 102 transmits the challenge symbol as an acoustic symbol over default channel $C_D$. The descriptor "Acoustic_Message_Sent ($M_D(T_?)$), $C_D$)" represents the challenge symbol transmitted over default channel $C_D$, where "$M_D(T_?)$" represents the mapping operation of new room/dummy token $T_?$ to the corresponding challenge symbol based on default mapping $M_D$. In other words, "$M_D(T_?)$" represents the challenge symbol. Because $M_Y(T_Y)$ and $M_D(T_?)$ both represent the same challenge symbol, the message "Acoustic_Message_Sent ($M_D(T_?)$) $C_D$)" is equivalent to the message "Acoustic_Message_Sent ($M_Y(T_Y)$), $C_D$)."

At 724, endpoint 104(1) receives the challenge symbol and decodes it based on challenge mapping $M_Y$ to recover corresponding challenge token $T_Y$. Practically speaking, only endpoint 104(1) will recover challenge token $T_Y$ from the challenge symbol. Other unchallenged endpoints listening to default channel $C_D$ and in range of base station 102 also receive the challenge symbol but are unaware of challenge mapping $M_Y$. Thus, the unchallenged endpoints decode the challenge symbol using default mapping $M_D$, instead of challenge mapping $M_Y$, to recover new room/dummy token $T_?$, instead of challenge token $T_Y$.

At 726, responsive to decoding room token $T_Y$, endpoint 104(1) sends to AS 106 a response message "Acoustic_Message_Received ($T_Y$)" including challenge token $T_Y$, and an identifier of endpoint 104(1). The response message notifies AS 106 that endpoint 104(1) decoded room token $T_Y$.

At 728, base station 102 receives the response message sent at 726 and, based on the response message, verifies that endpoint 104(1) is in range of the base station, and declares the endpoint authenticated. In an embodiment, base station 102 more specifically verifies that endpoint 104(1) occupies the same room as the base station based on the response message.

At 730, the unchallenged endpoints that were previously authenticated decode new room/dummy token $T_?$ send it to base station 102. We make special note that if a previously un-authenticated endpoint decoded the room/dummy token $T_?$ sent at 722 of this flow, the room/dummy token sent at 722 would appear to the un-authenticated endpoint as an initial message sent at 706 instead; in which case the un-authenticated endpoint would begin its own process of authentication/verification by executing the operations at 708 and 710 instead (i.e., send the message at 710 which message would include its own challenge mapping $M_Y$).

At 732, base station 102 receives the new room/dummy tokens from the unchallenged devices that were previously authenticated and verifies that those unchallenged endpoints are also in range of the base station or, more specifically, are in the same room as the base station.

Once AS 106 has verified endpoint 104(1) as described above, the AS may instruct base station 102 to grant the endpoint access to a secure channel between the base station and the endpoint and over which the two device may share information/content in a conference session, for example. Also, AS 106 may download to base station 102 user profile information for the user associated with endpoint 104(1), such as a user phone number, an email address, and so on.

Figure 8:
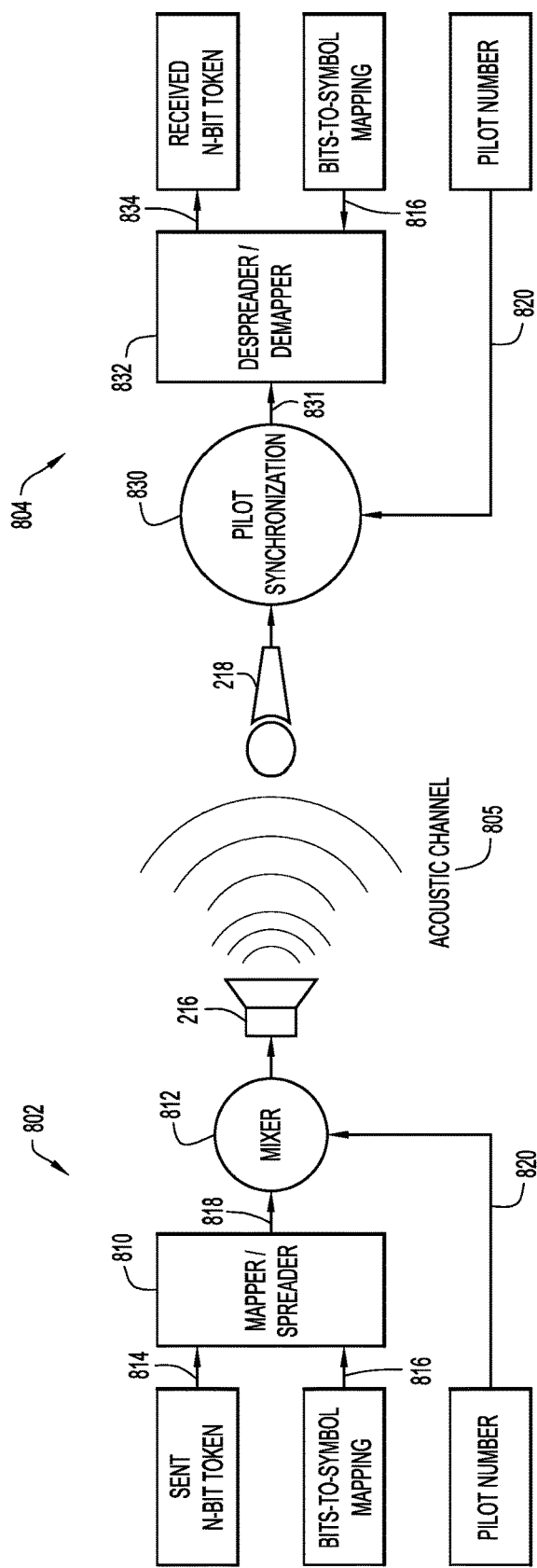
FIG. 8 shows various signal processing elements of a transmitter implemented in the base station and a receiver/decoder implemented in an endpoint, according to an embodiment.

With reference to FIG. 8, there are shown various signal processing elements of an example CDM spread spectrum transmitter 802 implemented in base station 102 and an example CDM spread spectrum receiver/decoder 804 implemented in each of endpoints 104/user devices 104. Transmitter 802 transmits a CDM spread spectrum signal, including an acoustic symbol, over an acoustic channel 805 and receiver/decoder 804 receives and decodes the CDM spread spectrum signal.

Transmitter 802 includes a mapper/spreader 810 followed by a mixer 812. Mapper/Spreader 810 receives a token 814, accesses/receives a mapping 816 and creates the acoustic symbol 818 that is to be associated with the token. That is, Mapper/Spreader 810 maps token 814 to a symbol 818 based on mapping 816, and provides the symbol to mixer 812. Mixer 812 also receives a spreading code index 820 for the pilot signal to be used, referred to as "Pilot Number" in FIG. 8. The Pilot Number employed defines a channel, i.e., the acoustic channel number/index, for this CDM spread spectrum example. Mixer 812 adds the pilot sequence to the acoustic symbol 818 and performs other necessary signal processing (e.g., pulse shaping and/or associated filtering/conditioning) to produce a complete CDM spread spectrum signal encoded with the symbol, and transmits the signal via loudspeaker 216 over acoustic channel 805.

Receiver 804 includes a pilot synchronization block 830 followed by a despreader/demapper 832. At receiver 804, microphone 218 detects the signal transmitted by transmitter 802 and provides the detected signal to pilot synchronization block 830. Pilot synchronization block 830 receives the same pilot number (spreading code index 820 for the pilot signal) used to define the acoustic channel number/index used at the transmitter. With this information, the pilot synchronization block performs necessary signal processing (e.g., filtering) and obtains the synchronization/timing information needed to decode the acoustic symbols sent over acoustic channel 805 (usually via a correlation process), to produce a signal 831. Signal 831 thus represents a noisy version of the acoustic symbols 818 (i.e., convolved with the room impulse response and with other signal impairments). Under the assumption of an acceptable acoustic channel, the despreader portion of despreader/demapper 832 will successfully recover the same symbol 818 sent by the transmitter, and provides this symbol to the demapper portion of despreader/demapper 832. Despreader/mapper 832 receives mapping 816 (used to produce the symbol in transmitter 802) and maps the recovered symbol 818 to a received token 834. In the absence of receive errors, the received token 834 will equal (i.e., be the same as or match) the transmitted token 814. Thus, receiver 804 receives the sent (acoustic) symbol 818 over acoustic channel 805 and decodes the received symbol to recover the sent token 814. The pilot number corresponds to the assigned acoustic channel number/index. To grant an endpoint access to a secure channel as discussed above, AS 106 may send the endpoint the pilot number for the secure acoustic channel. The above description of FIG. 8 assumes receiver 804 correctly decodes the acoustic signals, as it could also be the case that signal 831 (i.e., the received, noisy version of the sent acoustic symbol) is sufficiently different from acoustic symbol 818 (i.e., the original transmitted symbol) to cause the communication system to fail (i.e., received token 834 not to be equal to sent token 814).

Figure 9:
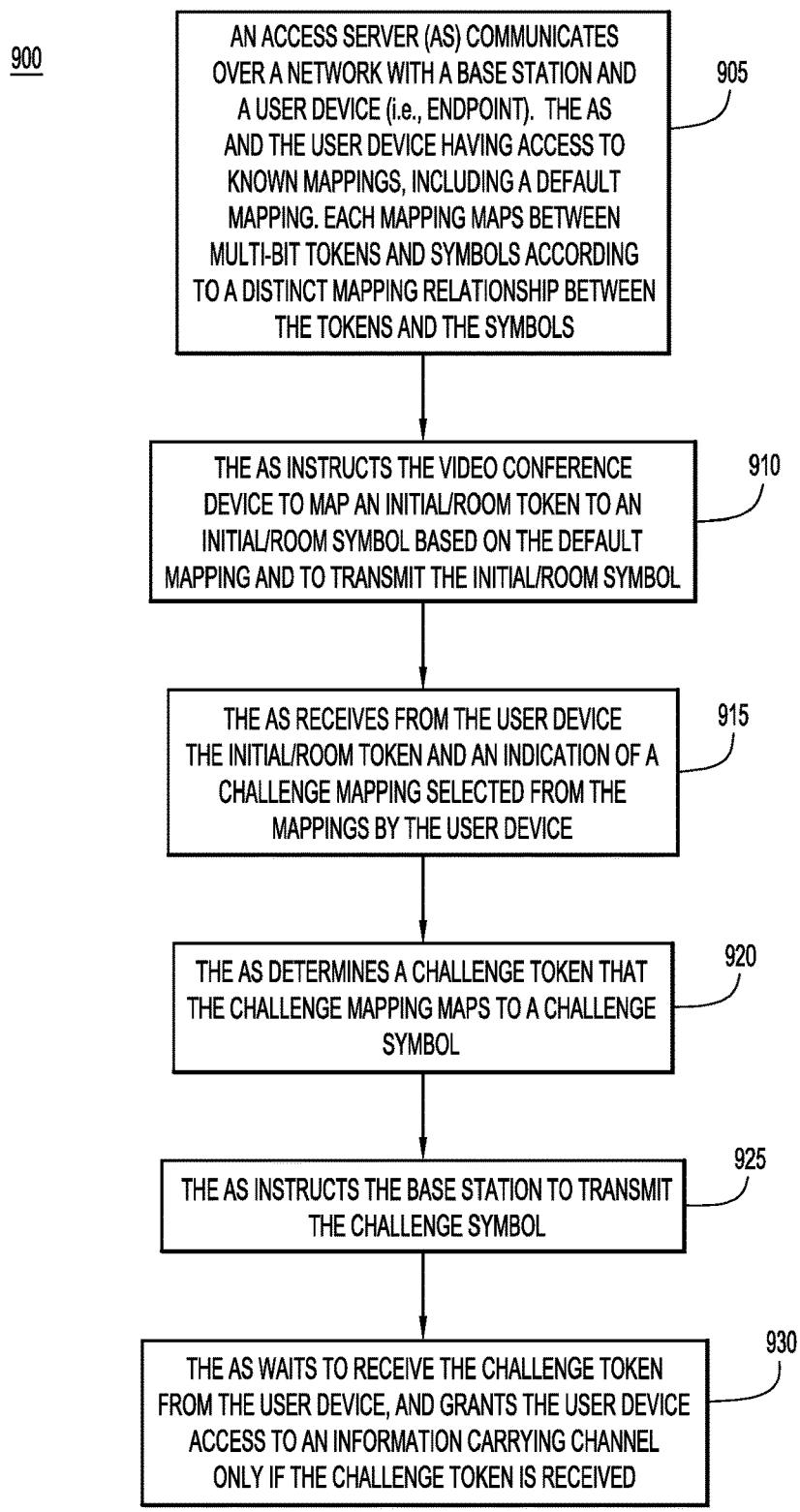
FIG. 9 is a flowchart of a method of response-challenge proximity verification that includes operations from the embodiments of FIG. 5 and FIG. 7, according to an embodiment.

With reference to FIG. 9, there is a flowchart of an example method 900 of response-challenge proximity verification/authentication that includes operations from the embodiments of FIG. 5 and FIG. 7. Method 900 is described primarily from the perspective of AS 106.

At 905, AS 106 is configured to communicate over network 110 with base station 102 (e.g., a video conference device) and endpoints 104 (e.g., user devices 104). Base station 102 and endpoints 104 are configured to communicate with each other over one or more acoustic channels. AS 106 and endpoints 104 have access to known mappings, including a default mapping $M_D$. Base station 102 may also have access to the known mappings, or AS 106 may send mappings to the base station as needed in the ensuing operations. Each mapping maps between multi-bit tokens and symbols according to a distinct mapping relationship between the tokens and the symbols for the given mapping.

At 910, AS 106 instructs base station 102 to map an initial/room token $T_X$ to an initial/room symbol based on default mapping $M_D$ and to transmit the initial/room symbol.

At 915, AS 106 receives from an endpoint (e.g., endpoint 104(1)) initial/room token $T_X$ and an indication/identifier of a challenge mapping $M_Y$ selected from the mappings by the endpoint.

At 920, AS 106 determines a challenge token $T_Y$ and uses that challenge mapping $M_Y$ to create a challenge symbol.

In the embodiment of FIG. 5, AS 106 simply selects challenge token $T_Y$. See, e.g., operation 518.

In the embodiment of FIG. 7, between operations 915 and 920, AS 106 selects a dummy/new room token $T_?$, and then at operation 920, the AS determines challenge token $T_Y$ based on: dummy/new room token $T_?$; default mapping $M_D$; challenge mapping $M_Y$; and a known relationship between the distinct mapping relationships of the challenge and default mappings (e.g., using permutation matrix $I_Y$). See, e.g., operation 718.

At 925, AS 106 instructs base station 102 to transmit the challenge symbol.

In the embodiment of FIG. 5, AS 106 instructs base station 102 to map challenge token $T_Y$ to the challenge symbol based on challenge mapping $M_Y$, and to transmit the challenge symbol. See, e.g., operation 520.

In the embodiment of FIG. 7, AS 106 instructs base station 102 to map dummy/new room token $T_?$ to the challenge symbol based on default mapping $M_D$, and to transmit the challenge symbol. See, e.g., operation 720.

At 930, AS 106 waits to receive challenge token $T_Y$ from the endpoint. If and when AS 106 receives the challenge token from the endpoint, the AS declares the presence of the endpoint verified and the endpoint authenticated. As a result, AS 106 grants the authenticated endpoint access to an information carrying channel with base station 102. In other words, at 930, AS 106 waits to receive challenge token $T_Y$ from the endpoint, and grants the endpoint access to an information carrying channel with base station 102 only if/when the challenge token is received from the thus authenticated endpoint.

Another embodiment directed to proximity verification in communication environment 100, referred to as an "on boarding" application, is now described with reference to FIGS. 10 and 11. The onboarding application uses similar messages to the messages previously described in connection with FIG. 7, except that some of the messages in the onboarding application described below additionally include a base station endpoint identifier.

Figure 10:
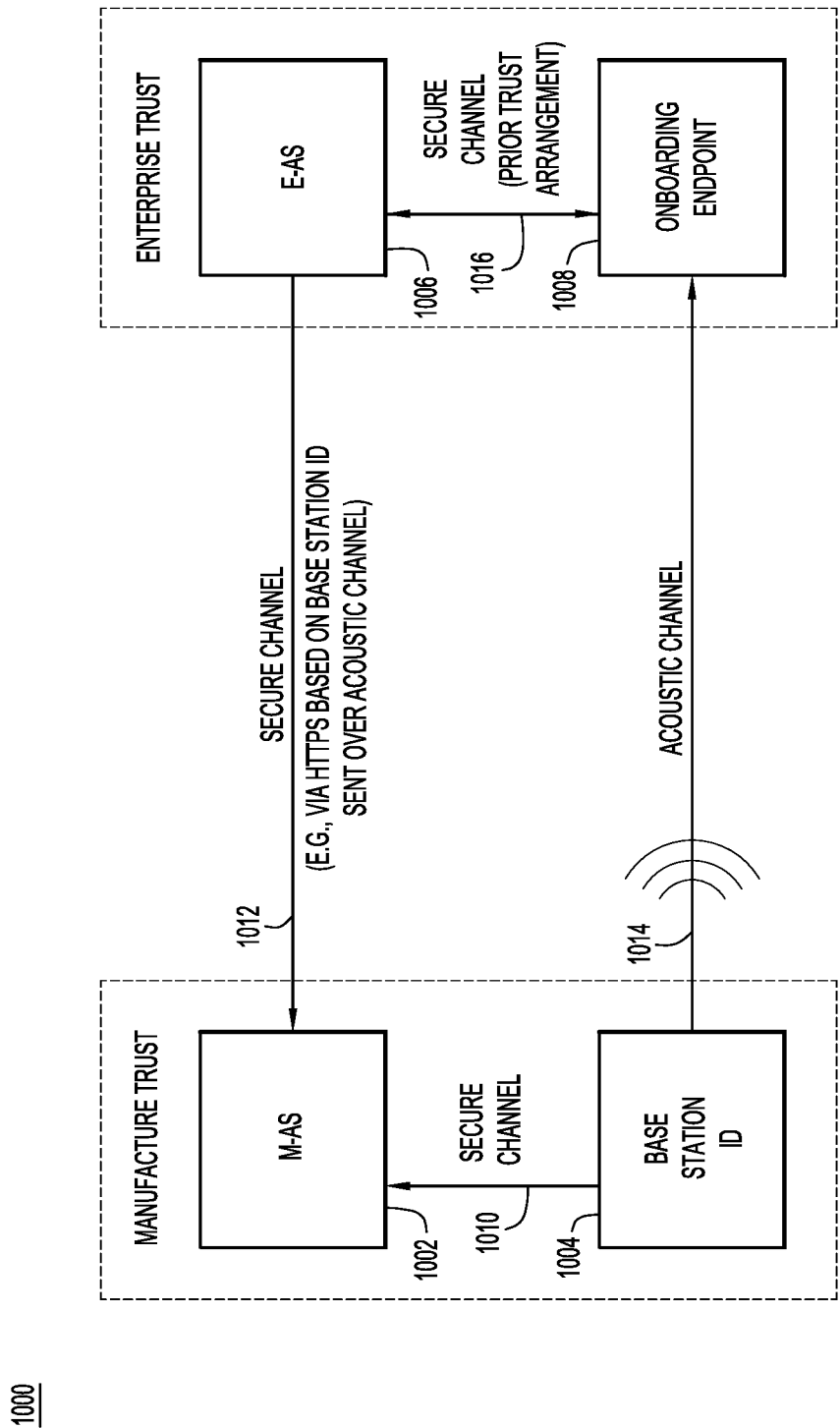
FIG. 10 is a block diagram of an onboarding system, which performs an onboarding application to onboard a base station, according to an embodiment.

With reference to FIG. 10, there is a block diagram of an example onboarding system 1000, which performs the onboarding application. In onboarding system 1000, AS 106 (from FIG. 1) is functionally decomposed into two separate access servers, including (i) a Manufacturer AS (M-AS) 1002 that is in a trust domain of a manufacturer of a base station 1004, and (ii) an Endpoint AS (E-AS) 1006 (e.g., user device 1006) that is in a trust domain of a company/enterprise that desires to "onboard" base station 1004. Typically, base station 1004 initially has a trust relationship with the manufacturer of base station 1004 (e.g., upon initial delivery or a factory reset). E-AS 1006 is similar to AS 106, except that the E-AS additionally provides onboarding functionality described below.

The onboarding application establishes a configuration of base station 1004 relative to E-AS 1006 of the company/enterprise. In the onboarding application, a particular endpoint 1008 has an existing trust relationship to E-AS 1006, whereas base station 1004 does not. Endpoint 1008 used here in the onboarding process may be referred to as the "onboarding endpoint." Endpoint 1008 may execute software configured to perform an onboarding process or may be a challenge-response proximity verification endpoint (similar to any of endpoints 104) as described previously. The onboarding application establishes and/or relies on various communication channels between actors in system 1000, including a secure channel 1010 between base station 1004 and M-AS 1002, a secure channel 1012 between E-AS 1006 and M-AS 1002, an acoustic channel 1014 between base station 1004 and endpoint 1008, and a secure channel 1016 between the endpoint and the E-AS.

Figure 11:
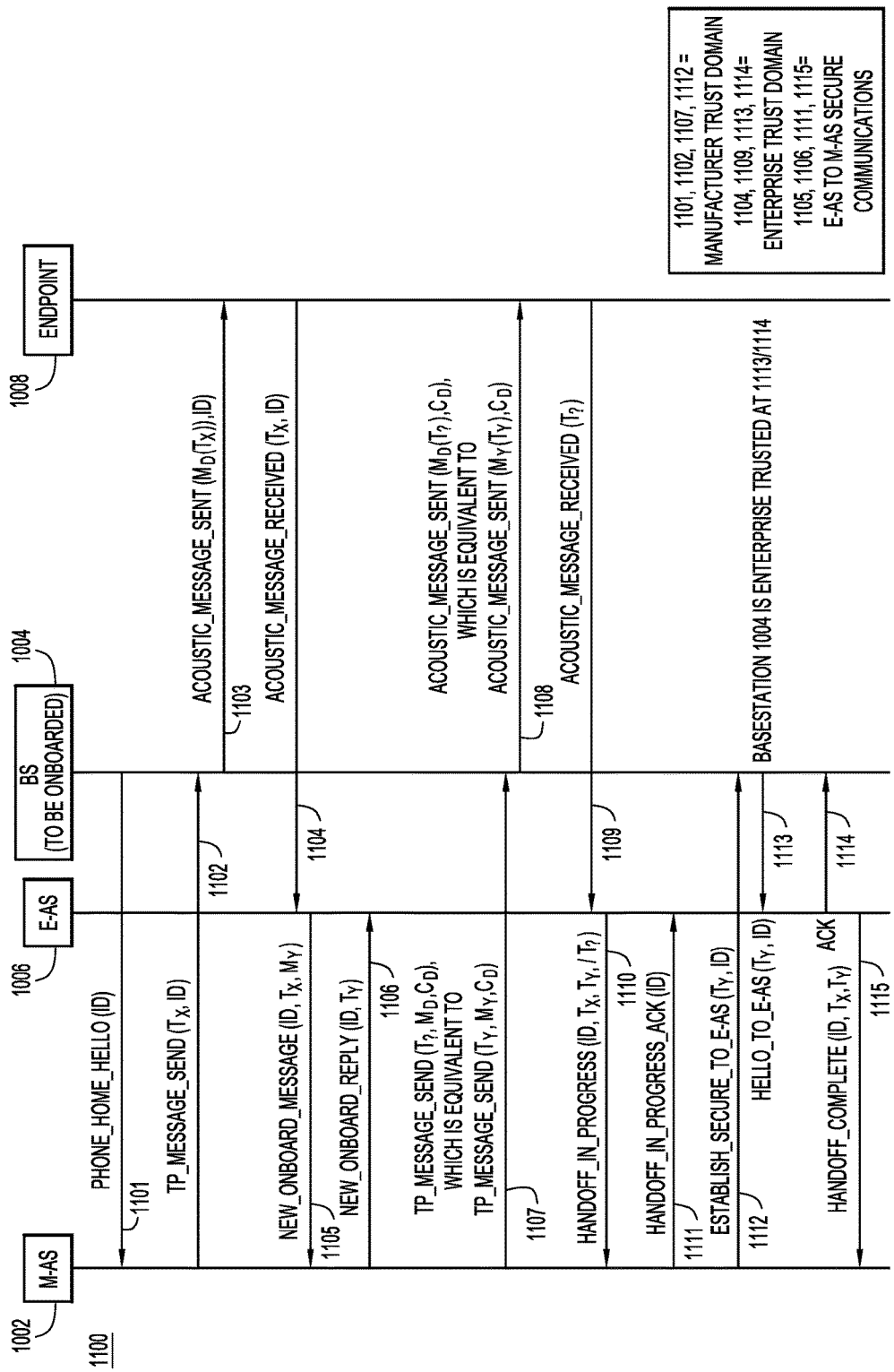
FIG. 11 is a transaction diagram by which challenge-response proximity verification/authentication using mappings is achieved using the onboarding application, according to an embodiment.

With reference to FIG. 11, there is an example transaction diagram 1100 by which challenge-response proximity verification/authentication using mappings is achieved according to the onboarding application/embodiment.

When base station 1004 first powers-up, the base station uses standard address resolution techniques (e.g., a global Uniform Resource Locator (URI) of some type) to find and contact M-AS 1002. Once M-AS 1002 is found, base station 1004 establishes trusted communications channel 1010 with the M-AS using any known technique (e.g., HTTPS and manufacturer certificates). M-AS 1002 and base station 1004 communicate with each other over communication channel 1010.

At 1101, base station 1004 sends to M-AS 1002 a message "Phone_Home_Hello (ID)" including information uniquely identifying the base station, i.e., a base station identifier ID. In an example, base station identifier ID may include a MAC address of the base station and/or other unique identifiers, i.e., base station identifier ID may include a set of different identifiers. The addition of base station identifier ID in the ensuing messages exchanged between the various actors in system 1000 is one difference between those messages and similar messages described in previous embodiments, e.g., in connection with FIG. 7.

M-AS 1002 selects a token $T_X$ and, at 1102, sends to base station 1004 a request/instruction "TP_Message_Send ($T_X$, ID)" to broadcast token $T_X$ along with base station identifier ID over acoustic channel 1014 based on default mapping matrix $M_D$.

In response, at 1103, base station 1004 transmits acoustic symbols "Acoustic_Message_Sent ($M_D(T_X)$, ID)."

Endpoint 1008 receives acoustic symbols "Acoustic_Message_Sent ($M_D(T_X)$, ID)," and recovers token $T_X$ and base station identifier ID from the received symbols. At 1104, endpoint 1008 sends token $T_X$ and base station identifier ID to E-AS 1006 over secure channel 1016. Upon receiving this information, E-AS 1006 recognizes that base station 1004 is not yet configured for use in the enterprise (i.e., the base station is not one previously known to the E-AS). Based on base station identifier ID, E-AS 1006 establishes secure connection 1012 to M-AS 1002 using any known technique (e.g., a globally reachable URI for a configuration portal of the base station manufacturer). At 1105, E-AS 1006 sends to M-AS 1002 a "New_Onboard_Message (ID, $T_X$, $M_Y$)" that conveys to the M-AS token $T_X$ received by endpoint 1004, base station identifier ID, and a mapping $M_Y$ selected by the E-AS.

At this point, M-AS 1002 knows whether $T_X$ was recently sent by base station 1004 (i.e., the base station having particular base station identifier ID). Thus, M-AS 1002 can proceed with a proximity verification challenge to base station 1004 based on mapping $M_Y$ provided by E-AS 1006.

Assuming that M-AS 1002 determines that the onboarding of endpoint 1008 to the enterprise is appropriate because, e.g., the endpoint is not on a revocation list or otherwise known not to belong to the enterprise that desires to onboard the endpoint, the M-AS chooses a token $T_Y$, and (knowing $M_Y$), determines a corresponding $T_?$. M-AS 1002 then performs both of the following actions in any order:

a. At 1107, M-AS 1002 sends to base station 1004 a request/instruction "TP_Message_Send ($T_?$, $M_D$, $C_D$)" over secure channel 1010 to instruct the base station to transmit symbol $M_D(T_?)$ (which is the same as symbol $M_Y(T_Y)$) over acoustic channel 1014, similar to operation 720 shown in FIG. 7; and b. At 1106, M-AS 1002 sends to E-AS 1006 over secure channel 1012 a message "New_Onboard_Reply (ID, $T_Y$)" to convey token $T_Y$ and base station identifier ID to the E-AS. FIG. 11 depicts transaction 1107 occurring before transaction 1106.

At this point E-AS 1006 knows $M_Y$ (which was chosen by the E-AS) and token $T_Y$ (which was chosen by M-AS 1002, and communicated to the E-AS). Thus, E-AS 1006 (like M-AS 1002) can determine token $T_?$ corresponding to token $T_Y$ to expect in an acoustic reply from endpoint 1008.

Base station 1004 receives request/instruction "TP_Message_Send ($T_?$, $M_D$, $C_D$)" sent at 1107 and, responsive thereto, at 1108, transmits a challenge symbol "Acoustic_Message_Sent (MD($T_?$)), $C_D$)" as an acoustic symbol over default channel $C_D$.

Endpoint 1008 receives the challenge symbol $T_?$ over acoustic channel 1014 and decodes it (using the default mapping $M_D$) to recover token $T_?$. In response, at 1109, endpoint 1008 sends to E-AS 1006 a response message "Acoustic_Message_Received ($T_?$)" including challenge token $T_?$.

E-AS 1006 receives the message sent at 1109 and determines whether token $T_?$ in the message is correct (i.e., if $M_D(T_?)=M_Y(T_Y)$). Thus, assuming the determination is successful, E-AS 1006 is assured that base station 1004 should be onboarded as the base station is in physical proximity to already trusted endpoint 1008 and has successfully passed the challenge.

At this juncture, there are several ways to inform base station 1004 of how to communicate with E-AS 1006 so that the base station can establish a secure channel with the E-AS. Because base station 1004 has a non-acoustic trust relationship with M-AS 1002, one such way is for E-AS 1006 to send non-acoustic messages to base station 1004 through the M-AS (i.e., the M-AS acts as a non-acoustic message relay between the base station and the E-AS). Another way is for E-AS 1006 to provide a globally reachable address for base station 1004 that other devices may use to communicate with the base station. The globally reachable address may be provided instead of communicating an enterprise-specific local addresses through M-AS 102 because the M-AS is not trusted by the enterprise. There are other ways of providing the rendezvous between base station 1004 and E-AS 1006.

Base station 1004 can then secure digital connectivity to E-AS 1006 using a variety of methods (e.g., using the onboarding tokens $T_X$ and $T_?$ as cookies/state of prior transactions, or another local proximity response/challenge) to authenticate to the E-AS. Once such secure connectivity between base station 1004 and E-AS 1006 has been obtained, other information such as local enterprise addresses can be exchanged securely between the base station and the E-AS and the onboarding process is complete. With reference to FIG. 11, there is shown a set of non-limiting messages 1110-1115 used to establish the secure connectivity, as follows:

a. At 1110, E-AS 1006 sends to M-AS 1002 a "Handoff_In_Progress" message conveying the base station identifier ID and tokens $T_X$, $T_Y/T_?$;

b. M-AS 1002 receives the message sent at 1110 and responsive thereto, at 1111, sends to E-AS-1006 an acknowledgement "Handoff_In_Progress_ACK" conveying the base station identifier ID;

c. At 1112, M-AS 1002 sends to base station 1004 an "Establish_Secure_to_E-AS" message conveying the required contact information needed by the base station to communicate with E-AS 1006, including token $T_Y$ and base station identifier ID. The Establish_Secure_to_E-AS message may also be sent to base station 1004 via a LAN address;

d. Response to the message sent at 1112, at 1113, base station 1004 sends to E-AS 1006 a message "Hello_to_E-AS" conveying token $T_Y$ and base station identifier ID;

e. E-AS 1006 receives the message sent at 1113 and, responsive thereto, at 1114, sends to base station 1004 an acknowledgement "ACK." At this juncture, BS 1004 is "enterprise trusted"; and f. At 1115, E-AS 1006 sends to M-AS 1002 a "Handoff Complete" message conveying base station identifier ID, and tokens $T_X$ and $T_Y$.

Optionally, yet another acoustic challenge may be performed from E-AS 1006 to base station 1004 if the E-AS has any remaining reservations about the integrity of M-AS 1002 in executing any form of the rendezvous described above. With this last challenge, the onboarding process is verified (given the pre-existing trust between E-AS 1006 and endpoint 1008).

In summary, challenge-response proximity verification or pairing is performed using token-to-symbol mappings. To initiate the pairing, a based station transmits a signal, such as a spread spectrum signal. A user/personal device listens for the signal. The personal device may be any bring your own device (BYOD), such as a phone or tablet, or a corporate issued laptop, for example. When the personal device comes within range of the base station the personal device detects the signal from the base station and begins pairing process. In one example, the base station will hear a personal device and issue a prompt to the user thereof with a "would you like to login" question. If the user selects "yes" to the prompt, the base station sends the personal device a room token (in acoustic symbol form). The personal device receives the token and responds to it by sending the room token to an access server over a network (e.g., wireless, 3G, 4G LTE, and so on). In response to receiving the token from the personal device, the access server sends a challenge token to the personal device via the base station to validate that the personal device is the device that it purports to be and verify where the personal device is located. When the personal device receives the challenge token, the personal device responds to the access server, thus completing authentication of the personal device. The access server then responds by pushing the users Personal Device Profile to the base station over the network. The base station loads the Personal Device Profile into its device configuration and reboots. This completes proximity verification and the base station is now configured for personal use by the end user.

In a shared space environment, the personal device may host application software that, when invoked, causes the personal device to associate to the base station, automatically. The base station represents a shared space device that acts as an extension of the personal device of the user and through which the user may use the shared space base station as his/her own personal device. As long as a personal device is "within hearing distance" (i.e., in range of) the base station, the personal device will not be prompted to take additional action. If one of the users personal device moves out of range of the base station (e.g., the user goes to the restroom, taking his/her phone with them, but their laptop remains), no action will be taken. If no personal devices remain "within hearing distance," the personal device(s) will receive a prompt asking the user if he/she wishes to "logout" of the initial shared space device (the base station). If the user selects "yes" the personal device will be immediately logged out of/disassociated from the shared space device. If user selects "no" the personal device will be prompted with the same question again in a predetermined period of time, e.g., 90 minutes. This may continue for multiple cycles. If another user enters the shared space area near the base station, the personal device of that user will be prompted to login. If they select yes and the previous user does not still have a personal device in the area the second user will override the first user.

In summary, in one form, a method is provided comprising: at an access server configured to communicate over a network with a video conference device and a user device, the access server and the user device having access to known mappings, including a default mapping, each mapping configured to map between multi-bit tokens and symbols according to a distinct mapping relationship between the multi-bit tokens and the symbols: first instructing the video conference device to map an initial token to an initial symbol based on the default mapping and to transmit the initial symbol; receiving from the user device the initial token and an indication of a challenge mapping selected from the mappings by the user device, and responsive to the receiving: determining among the tokens a challenge token that the challenge mapping maps to a challenge symbol; and second instructing the video conference device to transmit the challenge symbol; and waiting to receive the challenge token from the user device and, if the challenge token is received from the user device, granting the user device access to an information carrying channel between the video conference device and the user device.

In summary, in another form, an apparatus is provided comprising: a network interface unit configured to communicate over a network with a video conference device and a user device; and a processor coupled to the network interface unit and having access to known mappings, including a default mapping, that are also accessible to the user device, each mapping configured to map between multi-bit tokens and symbols according to a distinct mapping relationship between the multi-bit tokens and the symbols, the processor configured to: first instruct the video conference device to map an initial token to an initial symbol based on the default mapping and to transmit the initial symbol; receive from the user device the initial token and an indication of a challenge mapping selected from the mappings by the user device, wherein the processor is configured to, responsive to the receiving: determine among the tokens a challenge token that the challenge mapping maps to a challenge symbol; and second instruct the video conference device to transmit the challenge symbol; and wait to receive the challenge token from the user device and, if the challenge token is received from the user device, grant the user device access to an information carrying channel between the video conference device and the user device.

In summary, in yet another form, a non-transitory processor readable medium is provided. The processor readable medium stores instructions that, when executed by a processor of an access server configured to communicate over a network with a video conference device and a user device, the access server and the user device having access to known mappings, including a default mapping, each mapping configured to map between multi-bit tokens and symbols according to a distinct mapping relationship between the multi-bit tokens and the symbols, cause the processor to:
first instruct the video conference device to map an initial token to an initial symbol based on the default mapping and to transmit the initial symbol; receive from the user device the initial token and an indication of a challenge mapping selected from the mappings by the user device, and responsive to the receiving: determine among the tokens a challenge token that the challenge mapping maps to a challenge symbol; and second instruct the video conference device to transmit the challenge symbol; and wait to receive the challenge token from the user device and, if the challenge token is received from the user device, grant the user device access to an information carrying channel between the video conference device and the user device.

The above description is intended by way of example only. Various modifications and structural changes may be made therein without departing from the scope of the concepts described herein and within the scope and range of equivalents of the claims.

What is claimed is:

1. A method, comprising:
at an access server configured to communicate over a network with a video conference device and a user device, the access server and the user device having access to known mappings, including a default mapping, each mapping configured to map between multi-bit tokens and symbols according to a distinct mapping relationship between the multi-bit tokens and the symbols:
first instructing the video conference device to map an initial token to an initial symbol based on the default mapping and to transmit the initial symbol;
receiving from the user device the initial token and an indication of a challenge mapping selected from the mappings by the user device, and responsive to the receiving:
determining among the tokens a challenge token that the challenge mapping maps to a challenge symbol; and
second instructing the video conference device to transmit the challenge symbol; and
waiting to receive the challenge token from the user device and, if the challenge token is received from the user device, granting the user device access to an information carrying channel between the video conference device and the user device.

2. The method of claim 1, wherein the first instructing includes causing the video conference device to transmit the initial symbol as an acoustic symbol over an acoustic channel and the second instructing includes causing the video conference device to transmit the challenge symbol as an acoustic symbol over an acoustic channel that is either the same as or different from the acoustic symbol over which the initial symbol is transmitted.

3. The method of claim 1, wherein the mappings are each configured to map each token to only one symbol according to the distinct mapping relationship for that mapping and such that a given token maps to different symbols across the mappings.

4. The method of claim 3, further comprising at the access server, responsive to the receiving:
prior to the determining the challenge token, selecting from the tokens a dummy token that the default mapping maps to the challenge symbol, wherein the determining includes determining the challenge token such that the challenge token also maps to the challenge symbol, wherein the determining is based on the dummy token and a known relationship between the distinct mapping relationships of the challenge mapping and the default mapping.

5. The method of claim 4, wherein:
the first instructing includes sending the initial token to the video conference device in a first message that causes the video conference device to map the initial token to the initial symbol based on the default mapping and to transmit the initial symbol; and
the second instructing includes sending the dummy token to the video conference device in a second message that causes the video conference device to map the dummy token to the challenge symbol based on the default mapping and to transmit the challenge symbol.

6. The method of claim 5, further comprising, at the access server:
receiving the challenge token from a second endpoint as an indication that the second endpoint is within acoustic range of the teleconference device.

7. The method of claim 5, wherein:
the first message is configured to cause the video conference device to transmit the initial symbol as an acoustic symbol over a first acoustic channel; and
the second message is configured to cause the video conference device to transmit the dummy token symbol as an acoustic symbol over a second acoustic channel.

8. The method of claim 7, wherein the first acoustic channel and the second acoustic channel are the same acoustic channel.

9. The method of claim 7, wherein each distinct mapping relationship is a known permutation of each other distinct mapping relationship.

10. The method of claim 3, wherein:
the determining includes selecting the challenge token from the tokens; and
the second instructing the video conference device to transmit the challenge symbol includes sending to the video conference the challenge token and an indication of the challenge mapping in a message that causes the video conference device to map the challenge token to the challenge symbol based on the challenge mapping.

11. The method of claim 10, wherein the first instructing and the second instructing include instructing the video conference device to transmit the initial symbol and the challenge symbol on different ones of one or more acoustic channels, respectively.

12. The method of claim 1, further comprising, at the user device:
receiving the initial symbol and recovering the initial token from the received initial symbol based on the default mapping;
selecting the challenge mapping from the mappings;
sending to the access server the initial token and the indication of the challenge mapping;
receiving the challenge symbol and recovering the challenge token from the received challenge symbol based on the challenge mapping; and
sending to the access server the recovered challenge token.

13. An apparatus, comprising:
a network interface unit configured to communicate over a network with a video conference device and a user device; and a processor coupled to the network interface unit and having access to known mappings, including a default mapping, that are also accessible to the user device, each mapping configured to map between multi-bit tokens and symbols according to a distinct mapping relationship between the multi-bit tokens and the symbols, the processor configured to:
first instruct the video conference device to map an initial token to an initial symbol based on the default mapping and to transmit the initial symbol;
receive from the user device the initial token and an indication of a challenge mapping selected from the mappings by the user device, wherein the processor is configured to, responsive to the receiving:
  determine among the tokens a challenge token that the challenge mapping maps to a challenge symbol; and
  second instruct the video conference device to transmit the challenge symbol; and
wait to receive the challenge token from the user device and, if the challenge token is received from the user device, grant the user device access to an information carrying channel between the video conference device and the user device.

14. The apparatus of claim 13, wherein the processor is configured to first instruct by causing the video conference device to transmit the initial symbol as an acoustic symbol over an acoustic channel and the processor is configure to second instructing by causing the video conference device to transmit the challenge symbol as an acoustic symbol over an acoustic channel that is either the same as or different from the acoustic symbol over which the initial symbol is transmitted.

15. The apparatus of claim 13, wherein the mappings are each configured to map each token to only one symbol according to the distinct mapping relationship for that mapping and such that a given token maps to different symbols across the mappings.

16. The apparatus of claim 15, wherein the processor is further configured to, responsive to the receiving:
  prior to the determining the challenge token, select from the tokens a dummy token that the default mapping maps to the challenge symbol,
  wherein the processor is configured to determine by determining the challenge token such that the challenge token also maps to the challenge symbol, wherein the determining is based on the dummy token and a known relationship between the distinct mapping relationships of the challenge mapping and the default mapping.

17. The apparatus of claim 16, wherein:
the processor is configured to first instruct by sending the initial token to the video conference device in a first message that causes the video conference device to map the initial token to the initial symbol based on the default mapping and to transmit the initial symbol; and
the processor is configured to second instruct by sending the dummy token to the video conference device in a second message that causes the video conference device to map the dummy token to the challenge symbol based on the default mapping and to transmit the challenge symbol.

18. The apparatus of claim 17, wherein:
the first message is configured to cause the video conference device to transmit the initial symbol as an acoustic symbol over a first acoustic channel; and
the second message is configured to cause the video conference device to transmit the dummy token symbol as an acoustic symbol over a second acoustic channel.

19. The apparatus of claim 15, wherein:
the processor is configured to determine by selecting the challenge token from the tokens; and
the processor is configured to second instruct the video conference device to transmit the challenge symbol by sending to the video conference the challenge token and an indication of the challenge mapping in a message that causes the video conference device to map the challenge token to the challenge symbol based on the challenge mapping.

20. A non-transitory computer readable storage media encoded with instructions that, when executed by a processor of an access server configured to communicate over a network with a video conference device and a user device, the access server and the user device having access to known mappings, including a default mapping, each mapping configured to map between multi-bit tokens and symbols according to a distinct mapping relationship between the multi-bit tokens and the symbols, cause the processor to:
first instruct the video conference device to map an initial token to an initial symbol based on the default mapping and to transmit the initial symbol;
receive from the user device the initial token and an indication of a challenge mapping selected from the mappings by the user device, and responsive to the receiving:
  determine among the tokens a challenge token that the challenge mapping maps to a challenge symbol; and
  second instruct the video conference device to transmit the challenge symbol; and
wait to receive the challenge token from the user device and, if the challenge token is received from the user device, grant the user device access to an information carrying channel between the video conference device and the user device.

21. The computer readable storage media of claim 20, wherein the instructions to cause the processor to first instruct include instructions to cause the processor to cause the video conference device to transmit the initial symbol as an acoustic symbol over an acoustic channel and the instructions to cause the processor to second instruct include instructions to cause the processor to cause the video conference device to transmit the challenge symbol as an acoustic symbol over an acoustic channel that is either the same as or different from the acoustic symbol over which the initial symbol is transmitted.

22. The computer readable storage media of claim 21, wherein the mappings are each configured to map each token to only one symbol according to the distinct mapping relationship for that mapping and such that a given token maps to different symbols across the mappings.

23. The computer readable storage media of claim 22, further comprising instructions to cause the processor to, responsive to the receiving:
  prior to the determining the challenge token, select from the tokens a dummy token that the default mapping maps to the challenge symbol,
  wherein the instructions to cause the processor to determine include instructions to cause the processor to determine the challenge token such that the challenge token also maps to the challenge symbol, wherein the determining is based on the dummy token and a known relationship between the distinct mapping relationships of the challenge mapping and the default mapping.

24. The computer readable storage media of claim 23, wherein:

the instructions to cause the processor to first instruct include instructions to cause the processor to send the initial token to the video conference device in a first message that causes the video conference device to map the initial token to the initial symbol based on the default mapping and to transmit the initial symbol; and the instructions to cause the processor to second instruct include instructions to cause the processor to send the dummy token to the video conference device in a second message that causes the video conference device to map the dummy token to the challenge symbol based on the default mapping and to transmit the challenge symbol.

\* \* \* \* \*